(12) United States Patent
Venkatraman

(10) Patent No.: US 9,234,965 B2
(45) Date of Patent: Jan. 12, 2016

(54) INDOOR POSITIONING USING PRESSURE SENSORS

(75) Inventor: SaiPradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 12/885,077

(22) Filed: Sep. 17, 2010

(65) Prior Publication Data

US 2012/0072110 A1   Mar. 22, 2012

(51) Int. Cl.
*G01S 1/00*   (2006.01)
*G01S 19/48*   (2010.01)
(Continued)

(52) U.S. Cl.
CPC . *G01S 19/48* (2013.01); *G01C 5/06* (2013.01); *G01C 21/08* (2013.01); *G01C 21/20* (2013.01); *G01C 21/206* (2013.01); *G01C 21/34* (2013.01); *G01S 5/0045* (2013.01); *G01S 5/0236* (2013.01); *G01S 5/0257* (2013.01); *G01S 5/0263* (2013.01); *G01S 19/10* (2013.01); *G01S 19/46* (2013.01);
(Continued)

(58) Field of Classification Search
CPC ...... G01C 21/20; G01C 21/206; G01C 21/34; G01C 21/08; G01C 5/06; G09B 29/10; G09B 29/008; G09B 29/00; G01S 5/0263; G01S 19/10; G01S 19/46; G01S 19/48; G08B 25/10; H04W 4/02; H04W 4/025; H04W 4/04; H04W 4/043; H04W 64/00; H04W 64/003
USPC .......... 455/456.1, 456.2, 456.3, 456.5, 456.6, 455/457, 517, 524, 525; 370/328; 701/408, 701/409, 439, 519, 526, 541, 434; 702/176, 702/177, 187, 150, 153, 94; 73/385
See application file for complete search history.

(56) References Cited

U.S. PATENT DOCUMENTS 5,402,116 A * 3/1995 Ashley ........................ 340/870.1
6,518,918 B1 * 2/2003 Vannucci et al. ........ 342/357.31
(Continued)

FOREIGN PATENT DOCUMENTS

CN   101379367   3/2009
JP   2002286492 A   10/2002
(Continued)

OTHER PUBLICATIONS

International Search Report and Written Opinion—PCT/US2011/051953—ISA/EPO—Jan. 18, 2012, 7 pages.
(Continued)

*Primary Examiner* — Thomas G Black
*Assistant Examiner* — Sze-Hon Kong
(74) *Attorney, Agent, or Firm* — DeLizio Law, PLLC

(57) ABSTRACT

A pressure sensor can be implemented on a network device to minimize vertical positioning errors of the network device in an indoor environment. A reference altitude and a reference pressure associated with an access point in the indoor environment are received at the network device via a communication network. A pressure is determined at the network device in the indoor environment. An altitude of the network device associated with the pressure at the network device in the indoor environment is calculated based, at least in part, on the pressure at the network device, the reference pressure, and the reference altitude. A position of the network device in the indoor environment is determined based, at least in part, on the altitude of the navigation device and location information received from at least the access point.

23 Claims, 8 Drawing Sheets

(51) Int. Cl.
| | |
|---|---|
| G01C 21/20 | (2006.01) |
| G09B 29/10 | (2006.01) |
| G01C 21/34 | (2006.01) |
| G01S 19/46 | (2010.01) |
| G01C 21/08 | (2006.01) |
| G09B 29/00 | (2006.01) |
| G01S 5/02 | (2010.01) |
| G08B 25/10 | (2006.01) |
| G01C 5/06 | (2006.01) |
| G01S 5/00 | (2006.01) |
| G01S 19/10 | (2010.01) |

(52) U.S. Cl.
CPC .............. *G08B 25/10* (2013.01); *G09B 29/00* (2013.01); *G09B 29/008* (2013.01); *G09B 29/10* (2013.01)

(56) References Cited

U.S. PATENT DOCUMENTS

| | | | |
|---|---|---|---|
| 6,734,800 B1* | 5/2004 | Laieski | 340/601 |
| 6,941,145 B2* | 9/2005 | Ogino et al. | 455/456.1 |
| 7,015,817 B2* | 3/2006 | Copley et al. | 340/573.4 |
| 7,113,798 B2* | 9/2006 | Ariga | 455/456.4 |
| 7,127,257 B2* | 10/2006 | Riley et al. | 455/456.1 |
| 7,174,277 B2* | 2/2007 | Vock et al. | 702/188 |
| 7,313,461 B2* | 12/2007 | Sharma et al. | 700/245 |
| 7,397,357 B2* | 7/2008 | Krumm et al. | 340/501 |
| 7,509,139 B2* | 3/2009 | Yamasaki et al. | 455/525 |
| 7,602,339 B2* | 10/2009 | Fullerton et al. | 342/463 |
| 7,792,640 B2* | 9/2010 | Swope et al. | 701/507 |
| 7,821,986 B2* | 10/2010 | Thomson et al. | 370/328 |
| 7,899,006 B2* | 3/2011 | Boyd | 370/328 |
| 7,904,096 B2* | 3/2011 | Shyr et al. | 455/456.1 |
| 7,945,251 B2* | 5/2011 | Jendbro et al. | 455/414.1 |
| 7,995,482 B2* | 8/2011 | Polakos | 370/241 |
| 8,019,352 B2* | 9/2011 | Rappaport et al. | 455/456.1 |
| 8,180,377 B2* | 5/2012 | Yang et al. | 455/456.3 |
| 8,320,938 B2* | 11/2012 | Meyer et al. | 455/456.1 |
| 8,447,326 B2* | 5/2013 | Huang et al. | 455/456.1 |
| 8,626,195 B2* | 1/2014 | Noonan et al. | 455/456.2 |
| 8,767,637 B2* | 7/2014 | Novak et al. | 370/329 |
| 2002/0057340 A1* | 5/2002 | Fernandez et al. | 348/143 |
| 2004/0116134 A1* | 6/2004 | Maeda et al. | 455/457 |
| 2005/0068177 A1* | 3/2005 | Chun et al. | 340/550 |
| 2005/0079857 A1* | 4/2005 | Umezawa et al. | 455/406 |
| 2005/0227689 A1* | 10/2005 | Jewett | 455/433 |
| 2006/0100781 A1* | 5/2006 | Lin et al. | 701/216 |
| 2006/0100782 A1* | 5/2006 | Levi et al. | 701/217 |
| 2006/0172773 A1* | 8/2006 | Morishita et al. | 455/560 |
| 2007/0121557 A1 | 5/2007 | Sylvain | |
| 2007/0121560 A1* | 5/2007 | Edge | 370/338 |
| 2007/0155399 A1* | 7/2007 | Alberth et al. | 455/456.1 |
| 2007/0218823 A1* | 9/2007 | Wolf | 454/72 |
| 2007/0244633 A1 | 10/2007 | Phillips et al. | |
| 2008/0019299 A1* | 1/2008 | Lekutai et al. | 370/328 |
| 2008/0036661 A1* | 2/2008 | Smith et al. | 342/464 |
| 2008/0125965 A1* | 5/2008 | Carani et al. | 701/207 |
| 2008/0234928 A1* | 9/2008 | Matsuoka | 701/204 |
| 2008/0234930 A1* | 9/2008 | Cheok et al. | 701/207 |
| 2008/0299992 A1* | 12/2008 | Eitan et al. | 455/456.5 |
| 2008/0318596 A1* | 12/2008 | Tenny | 455/456.2 |
| 2009/0256742 A1* | 10/2009 | Kawaguchi et al. | 342/357.1 |
| 2009/0286556 A1* | 11/2009 | Yumoto et al. | 455/456.6 |
| 2009/0303113 A1* | 12/2009 | Alizadeh-Shabdiz | 342/357.01 |
| 2009/0315766 A1* | 12/2009 | Khosravy et al. | 342/357.07 |
| 2010/0021013 A1* | 1/2010 | Gale et al. | 382/113 |
| 2010/0032040 A1* | 2/2010 | Turiello | 137/861 |
| 2010/0090901 A1* | 4/2010 | Smith et al. | 342/451 |
| 2010/0172259 A1* | 7/2010 | Aggarwal et al. | 370/252 |
| 2010/0204916 A1 | 8/2010 | Garin | |
| 2010/0291949 A1* | 11/2010 | Shapira et al. | 455/456.1 |
| 2010/0299065 A1* | 11/2010 | Mays | 701/209 |
| 2011/0106449 A1* | 5/2011 | Chowdhary et al. | 701/214 |
| 2011/0121963 A1* | 5/2011 | Prehofer | 340/539.13 |
| 2011/0149868 A1* | 6/2011 | Krishnamurthy et al. | 370/328 |
| 2011/0161855 A1* | 6/2011 | Prehofer | 715/771 |
| 2011/0257923 A1* | 10/2011 | Boulton | 702/117 |
| 2012/0013475 A1* | 1/2012 | Farley et al. | 340/665 |
| 2012/0179305 A1* | 7/2012 | Kim et al. | 701/2 |
| 2013/0097281 A1* | 4/2013 | Boudreau et al. | 709/217 |
| 2014/0159859 A1* | 6/2014 | Karam et al. | 340/5.7 |

FOREIGN PATENT DOCUMENTS

| | | |
|---|---|---|
| JP | 2007278756 A | 10/2007 |
| JP | 2008304333 A | 12/2008 |
| JP | 2009530647 | 8/2009 |
| JP | 2009229204 A | 10/2009 |
| JP | 2009281741 A | 12/2009 |
| WO | WO2012037470 | 3/2012 |

OTHER PUBLICATIONS

Garin, Lionel J. et al., "Enhancing Altitude Accuracy in Automotive Navigation using MEMS Barometric Sensor with GPS", *Proceedings of the 2008 National Technical Meeting of the Institute of Navigation*, San Diego, CA Jan. 2008, 11 pages.

"Japanese Application No. 2013-529367 Office Action", Mar. 18, 2014, 13 pages.

"Korean Patent Application No. 2013-7009354,Notice of Grounds for Rejection", Apr. 9, 2014, 12 pages.

"Chinese Application No. 201180044336.2 Office Action", Feb. 27, 2015, 13 pages.

"Eurpean Application No. 11826028.0, European Search Report", Dec. 11, 2014, 8 pages.

"Japanese Patent Application No. 2013-529367, Office Action", Jan. 13, 2015, 8 pages.

\* cited by examiner

INDOOR POSITIONING USING PRESSURE SENSORS

BACKGROUND

Embodiments of the inventive subject matter generally relate to the field of navigation systems and, more particularly, to indoor positioning using pressure sensors.

Positioning systems typically receive a set of signals (e.g., navigation signals from satellites in the case of satellite-based positioning systems, radio signals from access points in the case of Wi-Fi based positioning systems, etc.) and determine a user's position. The positioning systems can analyze the received signals and determine timing information associated with the received signals to determine the user's position. Various techniques based on time of arrival, time difference of arrival, trilateration, triangulation can be used to determine the user's position.

SUMMARY

Various techniques for position estimation in an indoor environment are disclosed herein. In one embodiment, a reference altitude and a reference pressure associated with the reference altitude are received at a wireless network device via a communication network from an access point in the indoor environment. A pressure is determined at the wireless network device in the indoor environment. An altitude of the wireless network device associated with the pressure at the wireless network device in the indoor environment is calculated based, at least in part, on the pressure at the wireless network device, the reference pressure, and the reference altitude. A position of the wireless network device in the indoor environment is determined based, at least in part, on the altitude of the wireless network device and location information received from at least the access point.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
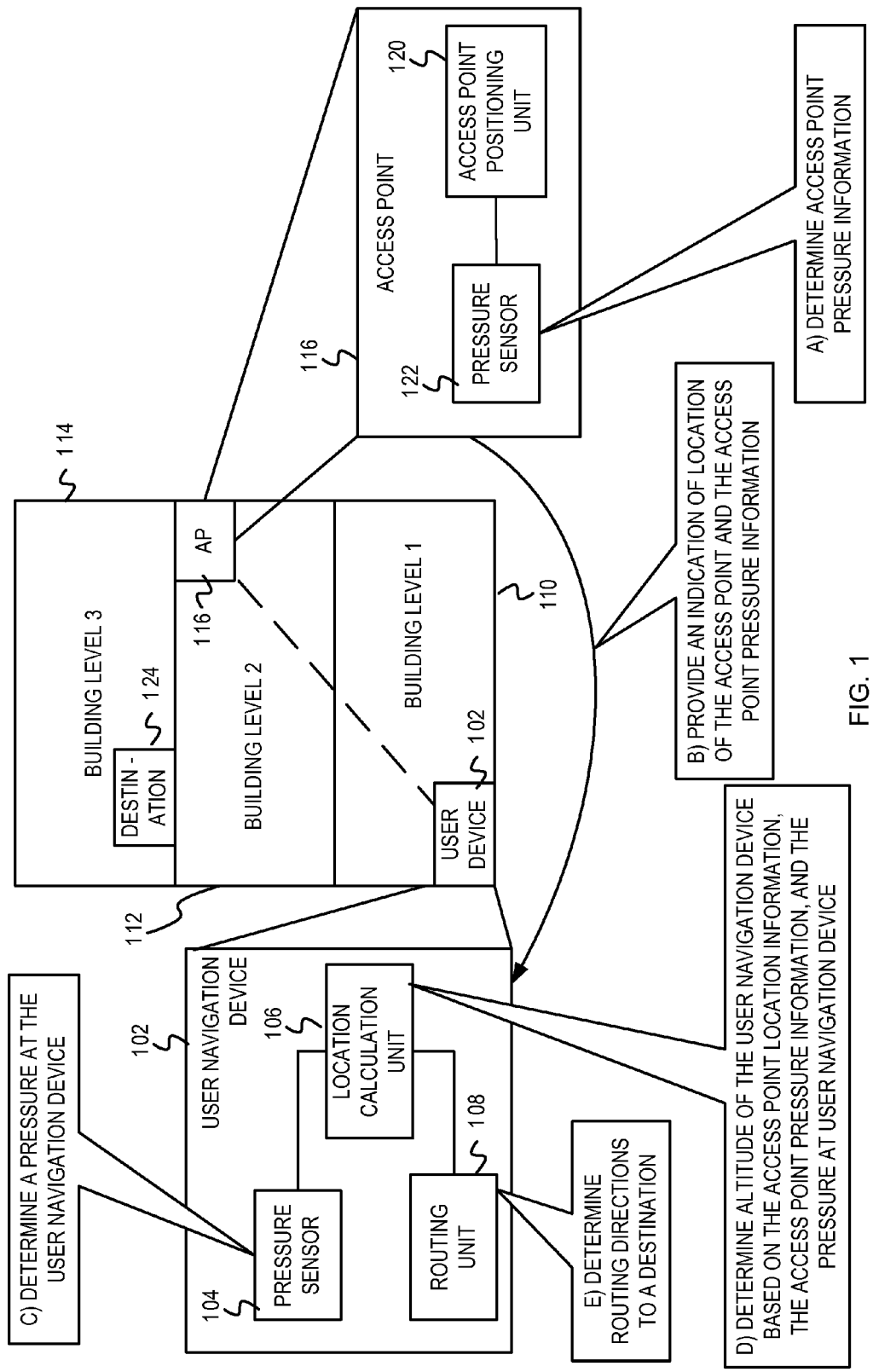
FIG. 1 is an example conceptual diagram illustrating indoor positioning using pressure sensors

The description that follows includes exemplary systems, methods, techniques, instruction sequences, and computer program products that embody techniques of the present inventive subject matter. However, it is understood that the described embodiments may be practiced without these specific details. For instance, although examples refer to using wireless local area network (WLAN) technologies for exchanging location and pressure information between an access point and a user navigation device, embodiments are not so limited. In other implementations, the location and pressure information can be exchanged using other suitable communication standards and technologies (e.g., ultrawide band (UWB) communication, cellular communication, etc.). In other instances, well-known instruction instances, protocols, structures, and techniques have not been shown in detail in order not to obfuscate the description.

A location-based navigation device utilizes precise vertical positioning for navigation in a multi-level indoor environment (e.g., in a multi-story building). For example, precise vertical positioning may be utilized to enable a user at the ground level of a mall to navigate to a shop on the second level of the mall. GPS-based navigation devices typically have poor indoor performance because navigation signals received from GPS satellites become weakened after propagation through multiple walls and other obstacles. The sensitivity of the GPS-based navigation devices may not be high enough to acquire four or more GPS satellites with relatively good geometry. The accuracy and availability of the GPS satellites can also be poor at lower levels of a multi-story building and error in determining the altitude of the navigation device may be higher than the vertical separation between the building levels. On the other hand, WLAN based positioning devices typically use a time of arrival (TOA) method or a time difference of arrival (TDOA) method to determine the location of the navigation device. However, calculating a three-dimensional location—namely a horizontal position (i.e., X-coordinate and Y-coordinate) and an altitude (i.e., Z-coordinate) of the navigation device can pose a challenge in the multi-level indoor environment. This is because altitude estimates determined using TOA or TDOA may not be very accurate especially if available access points are on the same plane (i.e., at approximately the same altitude) as the navigation device. Although altitude information (e.g., a name of a shop closest to the navigation device, a building level, an altitude, etc.) can be used to improve the accuracy of vertical positioning, the user would need to know and manually enter the altitude information. Errors in vertical positioning (e.g., an error in determining the building level of the destination) may result in the navigation device leading the user to a wrong destination (e.g., a shop at a building level below the actual building level of the destination). The errors in vertical positioning may result in the user having to retrace his/her steps, identify a nearest staircase/elevator/escalator, and go to the correct building level before finally proceeding to the destination.

In some embodiments, a pressure sensor can be incorporated into the navigation device to improve accuracy of vertical positioning of the navigation device and to enable determining a more precise altitude of the navigation device. Because pressure varies with altitude, different levels in a building (e.g., inside a mall, a parking garage, etc.) can be identified based on pressure variations at the different levels. Also, because the access points are fixed, the altitude and the corresponding pressure at the access points (preferably in the same environment as the navigation device) can serve as a reference based on which the altitude of the navigation device can be calculated. The relative pressure between the reference pressure at the access points and the measured pressure at the navigation device can be translated into a precise altitude difference between the access points and the navigation device, which can then be used to determine the altitude of the navigation device. Furthermore, the navigation device can identify and load a map of the building level on which a user of the navigation device is, based on knowledge of the altitude of the navigation device. The horizontal position of the navigation device can be determined based on the calculated altitude of the navigation device and based on location coordinates received from the access points. Based on knowledge of the horizontal position and the altitude of the navigation device, the navigation device can determine a three-dimensional route to the destination with precision. Configuring access points with pressure sensors to provide reference altitude (and corresponding pressure information to assist the navigation device) can improve accuracy associated with estimating the altitude of the navigation device. This, in turn, can improve precision of routing directions to the destination.

FIG. 1 is an example conceptual diagram illustrating indoor positioning using pressure sensors. FIG. 1 depicts a user navigation device 102 and an access point (AP) 116. The user navigation device 102 may be a dedicated GPS receiver or may be another suitable electronic device (e.g., a mobile phone) with GPS navigation functionality. The user navigation device 102 comprises a pressure sensor 104, a location calculation unit 106, and a routing unit 108. The access point 116 comprises a pressure sensor 122 and an access point positioning unit 120. In one example, the access point 116 and the user navigation device 102 are located within a building that comprises three levels—building level one 110, building level two 112, and building level three 114. In FIG. 1, the user navigation device 102 is at building level one 110, the access point 116 is a fixed access point and is located at building level two 116, and a destination 124 of the user navigation device 102 is at building level three 114.

At stage A, the pressure sensor 122 of the access point 116 determines a pressure at the access point 116 ("access point pressure information"). In some implementations, the pressure sensor 122 may determine the access point pressure information every pre-defined interval of time. In another implementation, the pressure sensor 122 may monitor the access point pressure information and may record a new value of the pressure on determining a change in the access point pressure information. In another implementation, the pressure sensor 122 may determine the access point pressure information in response to the access point 116 receiving a request from the user navigation device 102.

At stage B, the access point positioning unit 120 provides an indication of the location of the access point 116 ("access point location information") and the access point pressure information. The access point location information may be a two-dimensional position of the access point 116 (e.g., a latitude and longitude) or a three-dimensional position of the access point 116 (e.g., a latitude, longitude, and altitude). In some implementations, the access point positioning unit 120 may indicate the altitude of the access point 116 in terms of an absolute altitude (e.g., in meters, feet, etc.). In another implementation, the access point positioning unit 120 may indicate the altitude of the access point 116 in terms of a building level at which the access point 116 is located. For example, with reference to FIG. 1, the access point positioning unit 120 can indicate that the access point 116 is located at building level 112. In one implementation, the access point location information may be pre-programmed and the access point positioning unit 120 can read a predetermined memory address to determine the access point location information. In another implementation, the access point positioning unit 120 may estimate the access point location information based on location information received from other network devices, as will be described below. In another implementation, the access point positioning unit 120 can determine the access point location information using global position system (GPS) technologies, real time locating, etc., as will be described with reference to FIG. 3. In some implementations, the access point 116 can broadcast the access point location information and the access point pressure information at periodic intervals (e.g., in a beacon message). In another implementation, the access point 116 can transmit the access point location information and the access point pressure information in response to receiving a request for the access point location information and the access point pressure information from the user navigation device 102. The access point location information and the access point pressure information serve as reference information for the user navigation device 102 to calculate its altitude and horizontal position, as will be described in stages C-E.

At stage C, the pressure sensor 104 of the user navigation device 102 determines a pressure at the user navigation device 102. In some implementations, the pressure sensor 104 may determine the pressure at the user navigation device 102 every pre-defined interval of time. In another implementation, the pressure sensor 104 may monitor the pressure at the user navigation device 102 and may record a new value of the pressure on determining a change in the pressure at the user navigation device 102. In other implementations, the pressure sensor 104 can obtain multiple pressure measurements and can calculate an average pressure at the user navigation device 102. It is also noted that in some implementations the user navigation device 102 may activate the pressure sensor 104 on determining that the access point location information and the access point pressure information were received.

At stage D, the location calculation unit 106 of the user navigation device 102 determines an altitude of the user navigation device 102 based on the access point location information, the access point pressure information, and the pressure at the user navigation device 102. The location calculation unit 106 can convert the pressure at the user navigation device (determined at stage C) into an altitude of the user navigation device 102 as will be described in FIG. 4. It is noted, however, that if the altitude of the user navigation device 102 cannot be determined (e.g., because the access point location information, the access point pressure information, and/or the pressure at the user navigation device 102 are not available), various other techniques can be used to determine the altitude of the user navigation device 102. For example, contextual information (e.g., name or image of a shop closest to the user navigation device, a building level associated with the user navigation device, etc) provided by a user can be used to query a centralized server (not shown) and to determine the altitude of the user navigation device 102. As another example, the location calculation unit 106 can use the contextual information in conjunction with a map of the indoor environment (e.g., the building) stored on the user navigation device 102 to determine the altitude of the user navigation device 102. After the location calculation unit 106 determines the altitude of the user navigation device 102, the location calculation unit 106 can implement Wi-Fi based positioning techniques (e.g., time difference of arrival (TDOA), time of arrival (TOA), etc.) to determine a horizontal position (e.g., x-coordinate and y-coordinate) of the user navigation device 102. For example, the location calculation unit 106 can measure round trip transit times (e.g., time between transmitting a request for location/pressure information to the access point 116 and receiving a response from the access point 116) to the access points 116 in range of the user navigation device 102. In some implementations, if the user navigation device 102 comprises a GPS receiver (not shown), horizontal position of the user navigation device 102 can be determined using GPS techniques (e.g., triangulation based on GPS signals received from three or more GPS satellites).

At stage E, the routing unit 108 of the user navigation device 102 determines routing directions to the destination 124. The routing unit 108 can determine the routing directions to the destination 124, based on the location of the destination 124 and the location (i.e., the horizontal position and the altitude) of the user navigation device 102. In some implementations, the routing unit 108 may determine whether a map of the indoor environment of the user navigation device (e.g., a map of the building) is available. If so, the routing unit 108 can overlay the routing directions on the map (e.g., present arrows highlighting a route to the destination 124, etc.). Otherwise, the routing unit 108 can present text directions on the user navigation device 102. For example, with reference to FIG. 1, the location calculation unit 106 may determine that the user navigation device is currently at building level 110. Consequently, the routing unit 108 can determine whether a map of the building level 110 (depicting shops, elevators, etc. at building level 110) is available. If so, the routing unit can load the map of the building level 110 and can overlay instructions for navigating from building level 110 to building level 114. It is also noted that the pressure sensor 104 can continue to monitor the pressure at the user navigation device 102. On detecting a change in the pressure, the location calculation unit 106, in conjunction with the pressure sensor 104, can determine a new altitude of the user navigation device 102 and the routing unit 108 can recalculate the routing directions to the destination 124.

Although not depicted in FIG. 1, in some implementations, the access point 116 may also comprise a temperature sensor. In addition to providing the access point location information and the access point pressure information, the access point 116 can also provide an indication of the temperature at the access point 116. The temperature at the access point 116 can serve as a reference temperature. The location calculation unit 106 can use the temperature at the access point 116 to calculate the altitude of the user navigation device 102 with higher accuracy, as will be described in FIG. 4.

Figure 2:
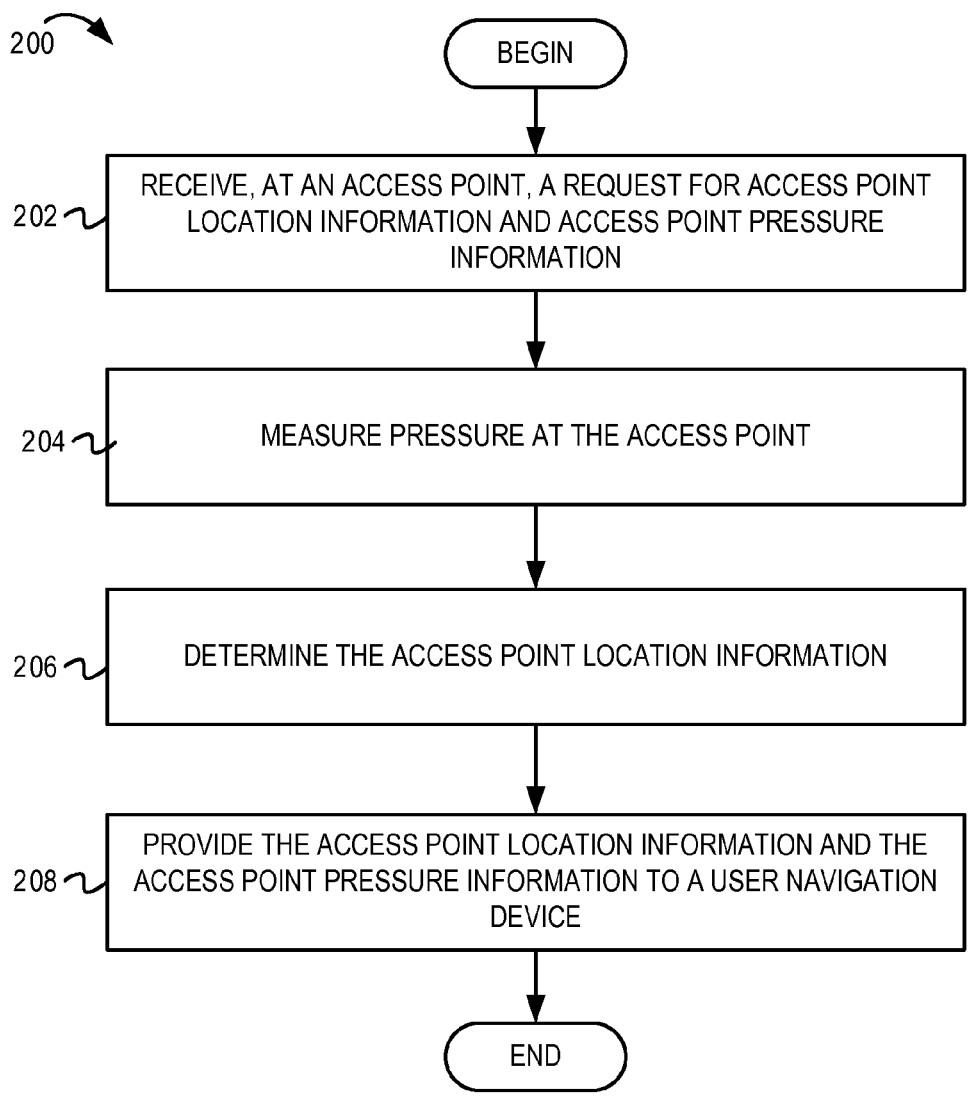
FIG. 2 is a flow diagram illustrating example operations of an access point for providing pressure and location information to a user device.

FIG. 2 is a flow diagram ("flow") 200 illustrating example operations of an access point for providing pressure and location information to a user navigation device. The flow 200 begins at block 202.

At block 202, a request for access point location information and corresponding pressure information is received at an access point. For example, in FIG. 1, the access point 116 can receive the request for access point location information and corresponding pressure information from the user navigation device 102. The flow continues at block 204.

At block 204, pressure at the access point is measured. For example, the pressure sensor 122 can measure the pressure at the access point 116. In some implementations, the pressure sensor 122 can determine the access point pressure information in response to receiving the request at block 202. However, in other implementations, the access point 116 may automatically trigger the pressure sensor 122 to measure the pressure at the access point 116 after a pre-determined time interval elapses. In another implementation, the access point 116 may retrieve previously measured access point pressure information. The flow continues at block 206.

At block 206, the access point location information is determined. For example, the access point positioning unit 120 can determine the access point location information. The access point location information can comprise a horizontal position (X-coordinate and Y-coordinate, latitude and longitude, etc.) and an altitude of the access point 116. In some implementations, the access point location information may be pre-defined and may be stored in a location information database (not shown) or may be hardwired as part of the access point 116. In another implementation, the access point positioning unit 120 may determine the access point location information using GPS techniques (as will be further described below with reference to FIG. 3). In another implementation, the access point positioning unit 120 may estimate the access point location information based on location information received from other wired/wireless network devices in the vicinity of the access point 116. For example, as will be further described below, the access point positioning unit 120 may receive location information from WLAN devices through a viral broadcast. The flow continues at block 208.

At block 208, the access point location information and the access point pressure information are provided to the user navigation device. For example, the access point 116 can provide the access point location information and the access point pressure information to the user navigation device 102. In some implementations, the access point 116 can provide the access point location information and the access point pressure information in response to a request (e.g., the request received at block 202) from the user navigation device 102. In another implementation, the access point 116 can broadcast the access point location information and the access point pressure information every pre-determined interval of time (e.g., in a beacon frame). It is noted that in some implementations, the access point 116 may only transmit the altitude (and not the horizontal position) of the access point and the pressure at the access point to the user navigation device. From block 208, the flow ends.

Although not described in FIG. 2, it is noted that because atmospheric pressure fluctuates with weather conditions (e.g., temperature, humidity, etc.), the access point 116 can execute operations to ensure that the access point pressure information provided to the user navigation device 102 is a most recent value of the pressure at the access point 116. Prior to transmitting the access point pressure information to the user navigation device 102, the access point 116 can read a timestamp associated with the access point pressure information received from the pressure sensor 122. The access point 116 can calculate a time difference between the timestamp and a current time. The access point 116 can transmit the access point pressure information to the user navigation device 102 if the difference time is less than a predetermined time threshold. The access point 116 can discard the access point pressure information if the difference time is greater than the predetermined time threshold. It is also noted that because the atmospheric pressure can fluctuate with temperature, in some implementations, the access point 116 can comprise a temperature sensor. The access point 116 can trigger the temperature sensor to determine the temperature at the access point 116 and can provide access point temperature information (at block 208) along with the access point location and pressure information to the user navigation device 102. As will be described in FIG. 4, the temperature at the access point 116 can be used to improve accuracy in determining the altitude of the user navigation device 102.

In some implementations, the access point 116 may be unaware of its location (e.g., because pre-programmed access point location information is unavailable at the access point 116). In such cases, if the access point 116 comprises a GPS receiver (or other location detection unit), the access point 116 can determine the access point location information as will be described in FIG. 3.

Figure 3:
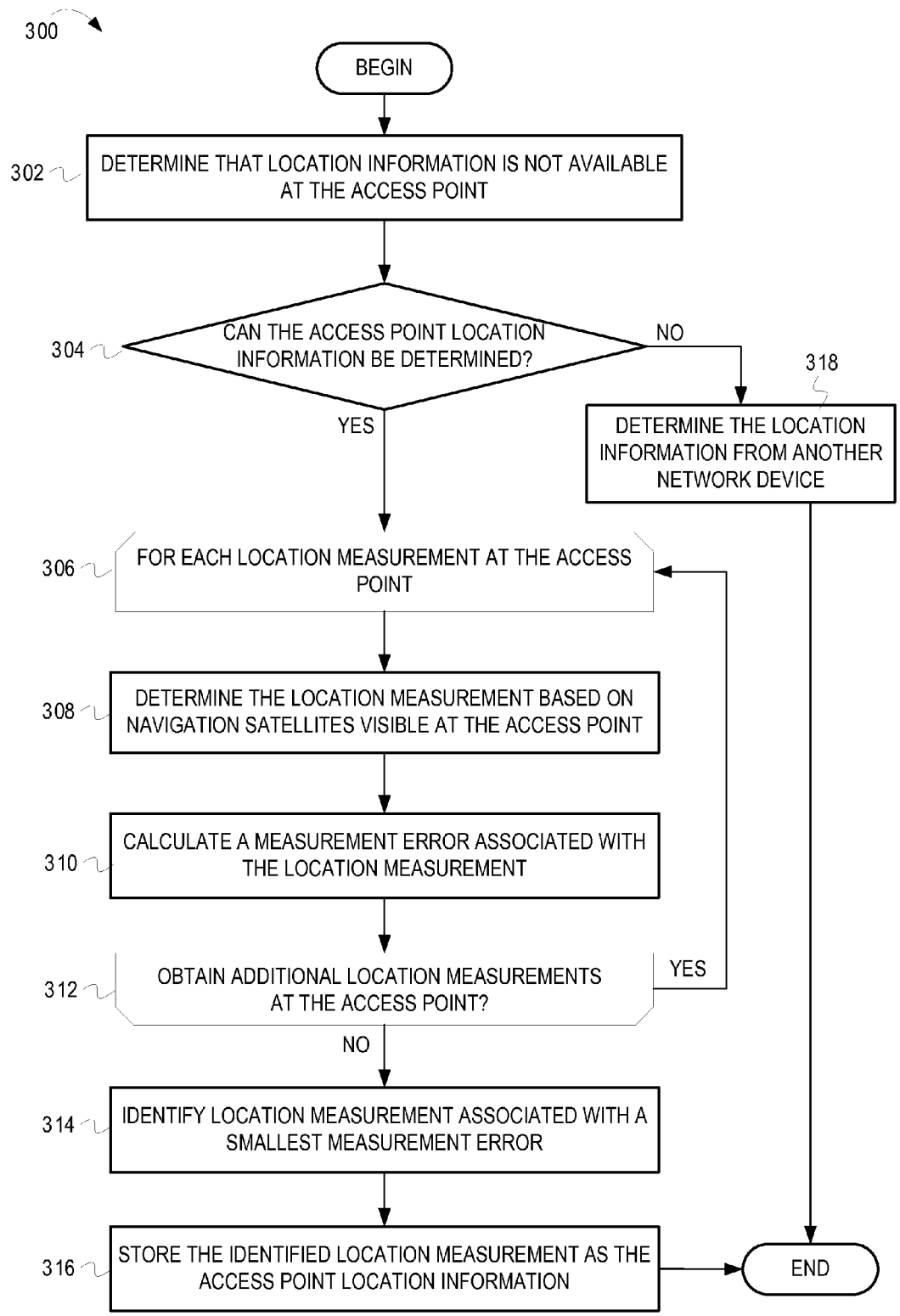
FIG. 3 is a flow diagram illustrating example operations of an access point determining location information.

FIG. 3 is a flow diagram 300 illustrating example operations of an access point determining location information. The flow 300 begins at block 302.

At block 302, it is determined that location information is not available at the access point. For example, the access point positioning unit 120 can determine that access point location information is not available. In one implementation, the access point positioning unit 120 can check the status of a flag to determine whether the access point location information is pre-programmed at the access point 116. In another implementation, the positioning unit 120 can determine whether previously calculated values of the access point location information are available at the access point 116. The flow continues at block 304 if the access point positioning unit 120 determines that the access point location information is not available at the access point 116.

At block 304, it is determined whether the access point has the ability to determine the access point location information. For example, the access point positioning unit 120 can determine whether the access point 116 comprises a GPS receiver or other location detection module capable of determining the access point location information. In some embodiments, the GPS receiver or other location detection module may be implemented as part of the positioning unit 120. In another embodiment, the GPS receiver or other location detection module may be distinct from the access point positioning unit 120. If it is determined that the access point 116 has the ability to determine the access point location information, the flow continues at block 306. Otherwise, the flow continues at block 318.

At block 306, a loop begins for each location measurement at the access point. For example, the access point positioning unit 120 initiates a loop to perform operations described in blocks 308-310 for each location measurement at the access point 116. A location measurement is an estimate of the access point location information (e.g., the horizontal position and the altitude of the access point) at a specified time instant based on navigation signals received at the specified time instant. The access point positioning unit 120 can determine the access point location information based on comparing different location measurements as will be described in blocks 314-316. The access point positioning unit 120 can obtain a set of location measurements based on navigation signals received from visible navigation satellites to determine the access point location information. In one implementation, the navigation satellites may be global positioning system (GPS) satellites. The access point positioning unit 120 can obtain each location measurement at different instants of time to account for movement of GPS satellites in the sky, visibility of the GPS satellites and GPS satellite geometry at different instants of time, etc. In one implementation, the access point positioning unit 120 may obtain a predetermined number of location measurements. In another implementation, the access point positioning unit 120 may obtain a location measurement every predetermined time interval to obtain the predetermined number of location measurements. For example, the access point positioning unit 120 may obtain a location measurement every 30 minutes until the access point positioning unit 120 obtains 10 location measurements. The flow continues at block 308.

At block 308, the location measurement is determined based on navigation satellites visible at the access point. For example, the access point positioning unit 120 can determine the location measurement based on navigation satellites visible at the access point 116. The access point positioning unit 120 can receive the navigation signals from one or more visible navigation satellites. The access point positioning unit 120 can use triangulation techniques to obtain the location measurement (i.e., an estimate of the position of the access point 116). For example, the access point positioning unit 120 may receive GPS signals from visible GPS satellites. The access point positioning unit 120 may determine whether a sufficient number of GPS satellites are visible (e.g., 3 GPS satellites to estimate the horizontal position, 4 GPS satellites to determine the horizontal position and the altitude of the user navigation device, etc.). In some implementations, if an insufficient number of GPS satellites are visible, the access point positioning unit 120 may not obtain a location measurement at the current time instant. Instead, the access point positioning unit 120 may wait for a predefined time interval (e.g., until the geometry and position of the GPS satellites in the sky changes) before obtaining another GPS measurement. The flow continues at block 310.

At block 310, a measurement error associated with the location measurement is calculated. For example, the access point positioning unit 120 can calculate the measurement error associated with the location measurement. Based on the position of the visible GPS satellites (e.g., coordinates of the visible GPS satellites in space), the access point positioning unit 120 can calculate a dilution of precision (DOP) associated with the location measurement. Dilution of precision is a measure of the effect of GPS satellite geometry on the precision/accuracy of the location measurement and of the quality of the GPS signals received from the GPS satellites. The precision of the location measurement may be affected by the position of the GPS satellites relative to each other. For example, if visible GPS satellites are close together in the sky, the geometry is considered to be weak and consequently a dilution of precision value associated with the location measurement may be high. A low dilution of precision value associated with the location measurement can represent a high accuracy of the location measurement (e.g., because of a wide angular separation between the visible GPS satellites used to obtain the location measurement). Obstacles (e.g., buildings, foliage, etc.) in a line of sight path between the access point positioning unit 120 and the visible GPS satellites may affect the precision of the location measurement and consequently the dilution of precision value associated with the location measurement. The number of visible GPS satellites may also influence the precision of the location measurement. In one implementation the access point positioning unit 120 may calculate and monitor a vertical dilution of precision (VDOP) because the location measurements typically exhibit more fluctuation in altitude estimates than in horizontal position estimates. For example, a high vertical dilution of precision value can represent less certainty in the altitude estimates solutions and indicate that the GPS satellites are at a low elevation. It is noted that in other implementations, various other techniques for estimating the measurement error associated with the location measurement can be implemented. After the access point positioning unit 120 determines the measurement error associated with the location measurement, the flow continues at block 312.

At block 312, it is determined whether additional location measurements are to be obtained at the access point. For example, the access point positioning unit 120 can determine whether additional location measurements are to be obtained and analyzed at the access point 116. As described above, the access point positioning unit 120 can obtain a predetermined set of location measurements. The access point positioning unit 120 can also obtain a location measurement every predetermined time interval based on GPS signals received from visible GPS satellites. At block 312, the access point positioning unit 120 can determine whether the predetermined set of location measurements have been obtained and/or whether a pre-determined time duration during which location measurements are to be obtained has elapsed. If it is determined that additional location measurements are to be obtained, the flow loops back to block 306 where a next location measurement is determined and analyzed in accordance with the operations described in blocks 308-310. If it is determined that a requisite number of location measurements are already obtained, the flow continues at block 314.

At block 314, a location measurement associated with a smallest measurement error is identified. For example, the access point positioning unit 120 can identify the location measurement associated with the smallest measurement error. In one implementation, the access point positioning unit 120 can compare the dilution of precision value associated with each of the location measurements and can identify the location measurement associated with the smallest dilution of precision value. In another implementation, the access point positioning unit 120 can monitor the vertical dilution of precision value associated with each of the location measurements, because the vertical dilution of precision is a measure of the accuracy of the altitude component of the location measurement. The access point positioning unit 120 can identify the location measurement associated with the smallest vertical dilution of precision value. In another implementation, the access point positioning unit 120 can monitor the horizontal dilution of precision value associated with each of the location measurements. The horizontal dilution of precision is a measure of the accuracy of the horizontal component of the location measurement. The access point positioning unit 120 can identify the location measurement associated with the smallest horizontal dilution of precision value. The flow continues at block 316.

At block 316, the location measurement associated with the smallest measurement error is stored as the access point location information. For example, the access point positioning unit 120 can store the location measurement associated with the smallest measurement error as the access point location information. In one implementation, the access point positioning unit 120 can designate the altitude component of the location measurement (e.g., z-coordinate of a location measurement) associated with the smallest vertical dilution of precision value (determined at block 314) as the altitude of the access point 116. The access point positioning unit 120 can designate the horizontal component of the location measurement (e.g., x-coordinate and y-coordinate of a location measurement) associated with the smallest horizontal dilution of precision value (determined at block 314) as the horizontal position of the access point 116. It is noted that the location measurement associated with the smallest vertical dilution of precision value may be different from the location measurement associated with the smallest horizontal dilution of precision value. Once the altitude and the horizontal position of the access point 116 are determined, the access point positioning unit 120 can transmit the altitude and horizontal position as the access point location information to the user navigation device 102. Additionally, as described above, the access point positioning unit 120 can also transmit access point pressure (and temperature) information. It is noted that the access point positioning unit 120 need not repeatedly perform operations described with reference to flow 300 every time a request for access point location information is received. The access point positioning unit 120 can access the stored access point location information (determined at block 316) and can provide the access point location information to the user navigation device 102, a location server (not shown), and/or other network devices that request the access point location information. In some implementations, the access point positioning unit 120 may re-execute the operations described with reference to FIG. 3 if the access point 116 is reset or restarted. From block 316, the flow ends.

At block 318, the access point location information is determined from another network device. The flow moves from block 304 to block 318 if it is determined that the access point 116 does not have the ability to determine the access point location information (e.g., if the access point 116 does not comprise a GPS receiver). In one implementation, the access point positioning unit 120 can receive a location of the user navigation device 102 in response to a location request broadcasted to other network devices in the vicinity of the access point 116. In another implementation, the access point positioning unit 120 can receive the location of the user navigation device 102 in a viral broadcast from the user navigation device 102. The access point 116 can use the location of the user navigation device 102 as the access point location information. In another implementation, the access point 116 can request the access point location information from a remote location server. From block 318, the flow ends.

Figure 4:
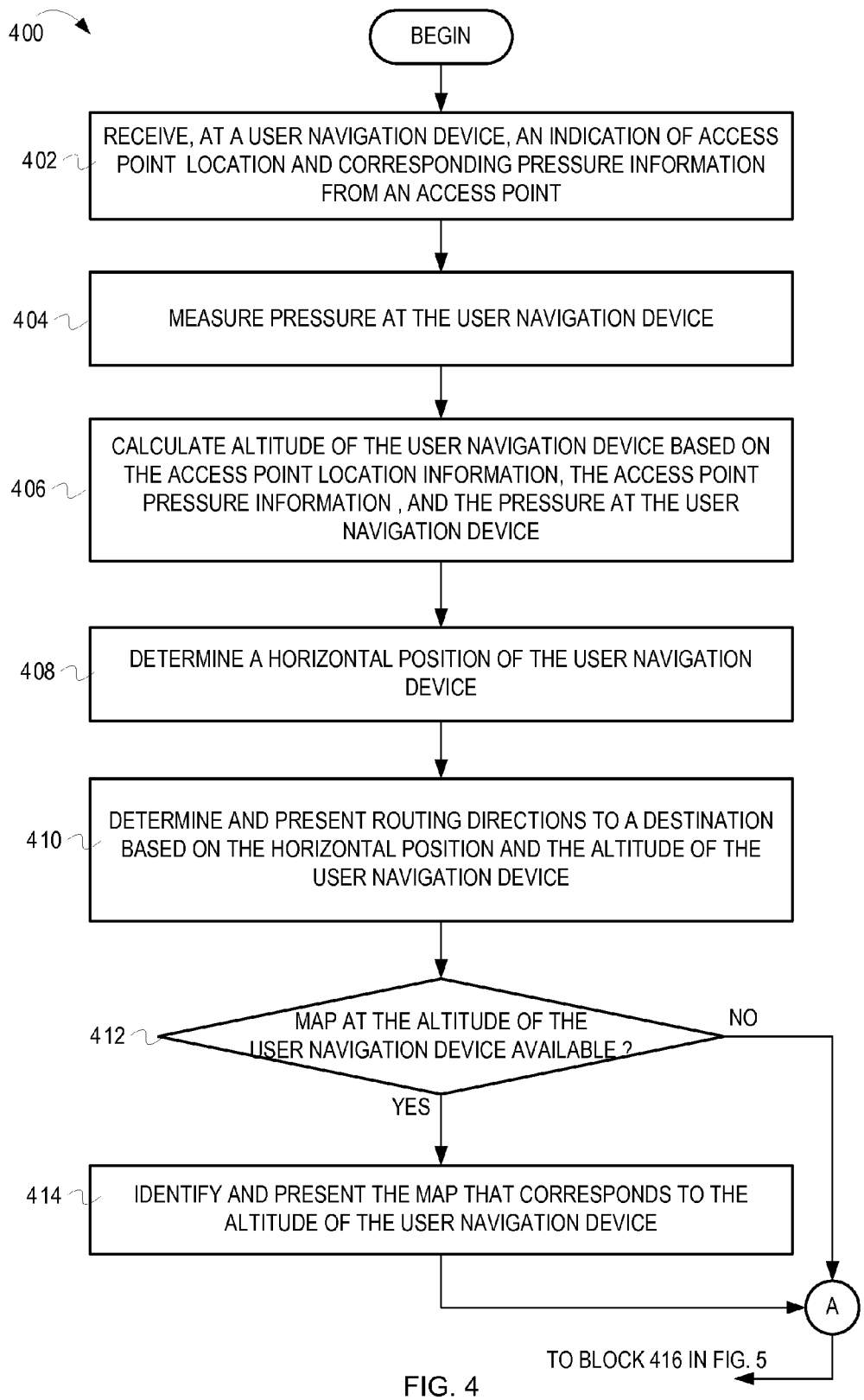
FIG. 4 depicts a flow diagram illustrating example operations for determining location of a navigation device and routing directions to a destination based on pressure sensors.
Figure 5:
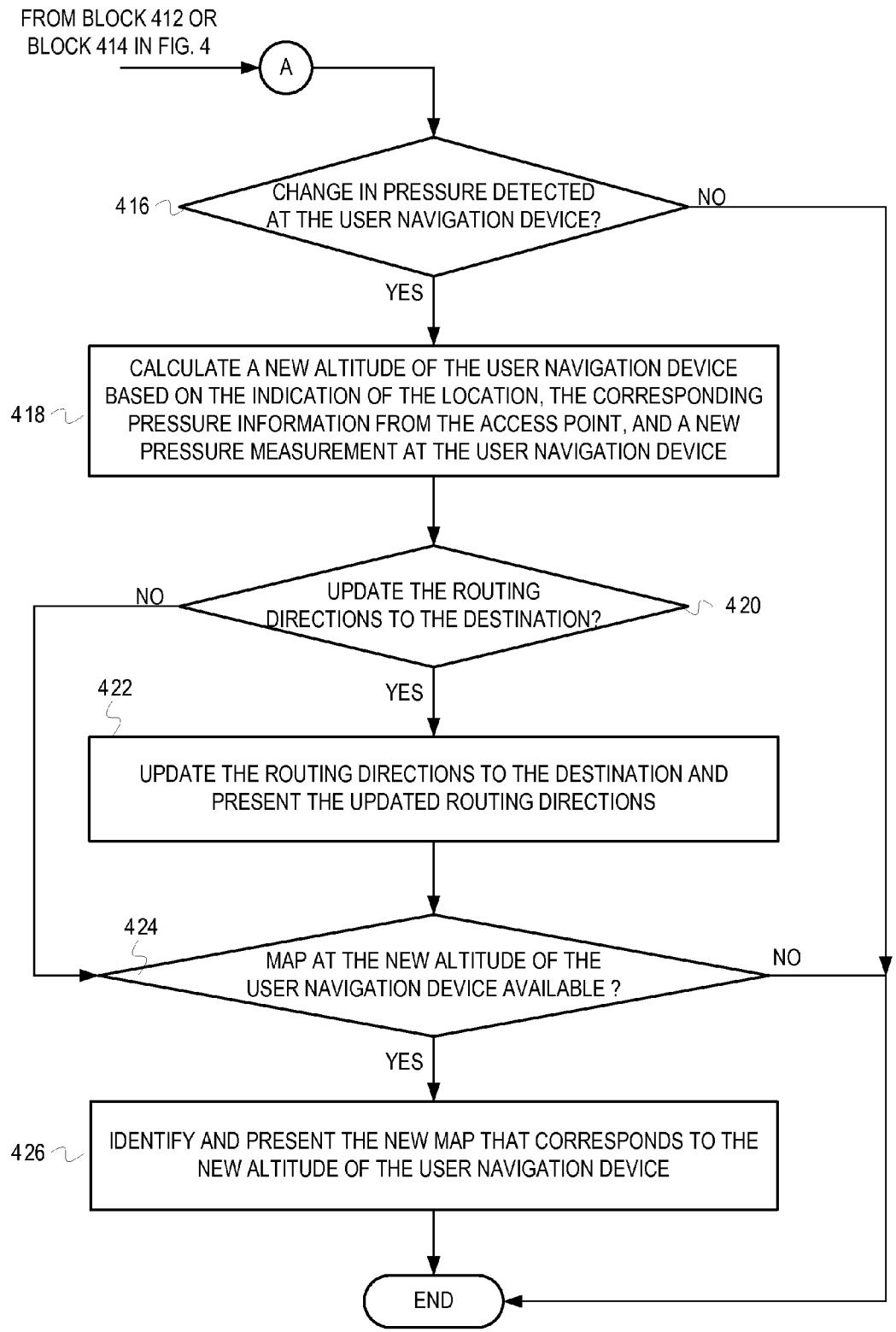
FIG. 5 is a continuation of FIG. 4 and depicts the flow diagram illustrating example operations for updating the location of a navigation device and the routing directions to the destination based on detecting a pressure variation.

FIG. 4 and FIG. 5 depict a flow diagram 400 illustrating example operations for determining location of a navigation device and routing directions to a destination. The flow 400 begins at block 402.

At block 402, an indication of access point location information and corresponding pressure information is received from an access point at a user navigation device. For example, with reference to FIG. 1, the user navigation device 102 receives the access point location information and the access point pressure information from the access point 116. In one implementation, the user navigation device 102 may receive the access point location and pressure information in response to a request transmitted by the user navigation device 102 to the access point 116. In another implementation, the user navigation device 102 may receive the access point location and pressure information in a periodically broadcast message (e.g., a beacon message) from the access point 116. In one implementation, the user navigation device 102 (e.g., the location calculation unit 106 of the user navigation device 102) can broadcast a request message for access point location and pressure information from all access points within a predefined range of the user navigation device 102. The access points that receive the request message can determine and transmit their respective access point location and pressure information to the user navigation device 102. In another implementation, the user navigation device 102 can detect one or more access points within the predefined range of the user navigation device 102 (e.g., based on receiving beacon messages from the one or more access points). The user navigation device 102 can transmit specific request messages (e.g., as part of a probe request frame) to each of the one or more detected access points. Accordingly, the one or more access points that receive the request messages can transmit their respective access point location and pressure information in a response message (e.g., as part of a probe response message) to the user navigation device 102. The flow continues at block 404.

At block 404, a pressure at the user navigation device is measured. For example, the pressure sensor 104 of the user navigation device 102 measures the pressure at the user navigation device 102. In one implementation, the location calculation unit 106 can enable the pressure sensor 104 on receiving the access point location and pressure information at block 402. In another implementation, the location calculation unit 106 can trigger the pressure sensor 104 to measure the pressure at the user navigation device 102. In response, the pressure sensor 104 can determine the pressure at the user navigation device 102. In some implementations, the pressure sensor 104 can obtain a predefined number of pressure measurements within a predefined measurement duration and/or separated by a predefined time interval. The location calculation unit 106 can calculate an average pressure at the user navigation device 102 based on receiving the predefined number of pressure measurements. As will be described below, the pressure sensor 104 can continuously monitor the pressure, record a new value of the pressure and cause operations described in the flow 400 to be initiated on determining a change in the pressure at the user navigation device 102. The relative pressure between the access point 116 and the user navigation device 102 can be translated into a precise altitude difference, which can then be used to determine the altitude of the user navigation device 102 as will be described below. The flow continues at block 406.

At block 406, an altitude of the user navigation device is calculated based, at least in part, on the access point location information, the access point pressure information, and the pressure at the user navigation device. For example, the location calculation unit 106 can calculate the altitude of the user navigation device 102. Because ambient temperature influences the access point pressure information, the location calculation unit 106 can also receive a temperature at which the access point pressure information was determined. In other words, a temperature sensor at the access point 116 can record the temperature at the access point 116 and can provide the temperature at the access point 116 to the user navigation device 102. The pressure, temperature, and altitude at the access point 116 are considered to be the reference pressure ($P_R$) represented in Pascal, the reference temperature ($T_R$) represented in Kelvin (K), and the reference altitude ($h_R$) represented in meters, respectively. Based on the reference pressure, the reference temperature, and the reference altitude, the location calculation unit 106 can convert the pressure (P) at the user navigation device 102 into an altitude (h) of the user navigation device 102, as depicted in Eq. 1. Additionally, in Eq. 1, L represents the temperature lapse rate and has a value of −0.0065 K/m, $g_0$ represents the gravitational acceleration constant and has a value of 9.80665 m/s², M represents the molar mass of air and have a value of 0.0289644 kg/mol, and R represents the universal gas constant and has a value of 8.31432 N·m/(mol·K).

$$P = P_R \left[ \frac{T_R}{T_R + L(h - h_R)} \right]^{\frac{g_0 \cdot M}{R \cdot L}} \quad \text{Eq. 1}$$

It is noted that the Eq. 1 does not take dynamic pressure due to motion of the user navigation device 102 into account. In determining the altitude of the user navigation device 102 based on Eq. 1, the location calculation unit 106 assumes that the velocity of the user navigation device 102 in the indoor environment (e.g., the velocity of a pedestrian user) is too small to significantly impact the pressure at the user navigation device 102. However, if velocity of the user navigation device 102 is significant to cause a significant fluctuation in the pressure at the user navigation device 102, the location calculation unit 106 may prompt the user of the user navigation device 102 to calibrate the pressure sensor 104 when the user navigation device 102 is stationary to mitigate the impact of dynamic pressure on pressure measurements captured by the pressure sensor 104. The flow continues at block 408.

At block 408, a horizontal position of the user navigation device is determined. For example, the location calculation unit 106 can determine the horizontal position of the user navigation device 102. In one implementation, as described with reference to block 402 of FIG. 4, the location calculation unit 106 can receive the access point location information from the access point 116. In addition to the altitude of the access point 102 (used at block 406 to determine the altitude of the user navigation device 102), the access point location information can also indicate a horizontal position of the access point as Cartesian coordinates (e.g., X-coordinate and Y-coordinate), as latitude and longitudes, etc. The location calculation unit 106 can measure round trip transit times to the access point 116 (e.g., time between transmitting a request for access point location information and receiving the access point location information from the access point 116). The location calculation unit 106 can calculate the horizontal position of the user navigation device 106 based on the altitude of the user navigation device 102 (determined at block 406) and based on measured round-trip transit times to the access point 116. Prior to calculating the horizontal position of the user navigation device 106, the location calculation unit 106 can determine the number of available access points (e.g., the number of access points from which the user navigation device 102 can receive access point location information). Typically, to determine a three-dimensional location of the user navigation device 102, the location calculation unit 106 needs to receive access point location information from at least four access points. However, because the location calculation unit 106 already calculated the altitude of the user navigation device (at block 406), the location calculation unit 106 can determine the horizontal position of the user navigation device 102 if at least three access points are available. The location calculation unit 106 can implement a least squares positioning algorithm, a time of arrival algorithm, a time difference of arrival algorithm, etc., to calculate the horizontal position of the user navigation device 102. In some implementations, if less than three access points are available, the location calculation unit 106 may estimate the horizontal position of the user navigation device 102. For example, if only two access points are available, the location calculation unit 106 can estimate the horizontal position of the user navigation device 102 by calculating a weighted average of coordinates of the available access points. As another example, if only one access point is available, the location calculation unit 106 can designate the horizontal position of the access point 116 as the horizontal position of the user navigation device 102. However, it is noted that if the location calculation unit 106 does not receive the access point location information, the location calculation unit 106 can determine the horizontal position and/or the altitude of the user navigation device 102 (e.g., using GPS techniques) in accordance with operations described with reference to FIG. 3. The flow continues at block 410.

At block 410, routing directions to a destination are determined based on the horizontal position of the user navigation device and the altitude of the user navigation device. For example, the routing unit 108 of the user navigation device 102 determines routing directions to the destination 124 based on the location of the user navigation device 102. The location of the user navigation device 102 comprises the horizontal position of the user navigation device 102 (determined at block 408) and the altitude of the user navigation device 102 (determined at block 406). The routing unit 108 can use any suitable routing algorithm (e.g., distance vector routing algorithm) to determine the routing directions from the user navigation device 102 to the destination 124. The routing unit 108 may also determine the routing directions subject to various constraints such as routing via a shortest path, routing via a specified intermediate point (e.g., via a specified shop at an intermediate point in the shopping mall), etc. The flow continues at block 412.

At block 412, it is determined whether a map at the altitude of the user navigation device 102 is available. For example, the routing unit 108 determines whether the map of the indoor environment at the altitude of the user navigation device 102 is available. In one implementation, the routing unit 108 can convert the altitude of the user navigation device 102 into building level information. For example, based on knowledge that the floor to ceiling distance in a building is 6 meters and that the altitude of the user navigation device is 2 meters, the routing unit 108 can determine that the user navigation device 102 is at the building level 1 of FIG. 1. In another implementation, the location calculation unit 106 may convert the altitude of the user navigation device 102 into building level information and may communicate the building level associated with the user navigation device 102 to the routing unit 108. Accordingly, the routing unit 108 can determine whether a map corresponding to the building level associated with the user navigation device 102 is available. In one implementation, the routing unit 108 can access a map database of the user navigation device 106 to determine whether the map corresponding to the building level associated with the user navigation device 102 is available. In another implementation, the routing unit 108 can query a remote server to determine whether the map corresponding to the building level associated with the user navigation device 102 is available. If the map is available, the routing unit 108 may download the map from the remote server and may present the map on the user navigation device 102. It is noted that if the map corresponding to the building level associated with the user navigation device 102 is not available, the routing unit 108 may not present the map on the user navigation device 102. Instead, the routing unit 108 may present step-by-step directions from a current location of the user navigation device 102 to the destination 124 (e.g., in a text format on the user navigation device 102, as audio instructions, etc.). If it is determined that the map that corresponds to the altitude of the user navigation device available, the flow continues at block 414. Otherwise, the flow continues at block 416 in FIG. 5.

At block 414, the map that corresponds to the altitude of the user navigation device is identified and is presented on the user navigation device. For example, the routing unit 108 identifies and presents the map that corresponds to the altitude of the user navigation device 106. Additionally, the routing unit 108 may overlay routing directions and other information (e.g., shop names at the shopping mall, etc.) on the map presented on the user navigation device 106. The flow continues at block 416 in FIG. 5.

At block 416, it is determined whether a change in pressure is detected at the user navigation device. In one implementation, the pressure sensor 104 of the user navigation device 102 can monitor the pressure at the user navigation device 102. The pressure sensor 104 can transmit a notification (e.g., to the location calculation unit 106) to indicate the change in the pressure at the user navigation device 102. In another implementation, the pressure sensor 104 may be a passive sensing device. The pressure sensor 104 may obtain a pressure measurement at the user navigation device 102 every predetermined interval of time and may communicate the pressure measurement to the location calculation unit 106. The location calculation unit 106, in turn, can compare a current pressure measurement with a last received pressure measurement and determine whether there was a change in the pressure at the user navigation device 102. If a change in the pressure at the user navigation device 106 is not detected, the location calculation unit 106 can assume that the altitude of the user navigation device 106 has not changed (i.e., that the user has not moved to a different level within the building). Accordingly, the location calculation unit 106 may only track the horizontal position of the user navigation device 102 and may not recalculate the altitude of the user navigation device 102. If a change in pressure is detected at the user navigation device, the location calculation unit 106 can assume that the altitude of the user navigation device 106 has changed and the flow continues at block 418. Otherwise, the flow ends.

At block 418, a new altitude of the user navigation device is calculated based, at least in part, on the access point location information, the access point pressure information, and a new pressure at the user navigation device 102. For example, the location calculation unit 106 can calculate the new altitude of the user navigation device 102 as described with reference to block 406 of FIG. 4. In some implementations, the user navigation device 102 may broadcast a new request for access point location and pressure information. In another implementation, the location calculation unit 106 can use previously received access point location and pressure information to calculate the new altitude of the user navigation device 102. The location calculation unit 106 can also use the new altitude of the user navigation device 102 to calculate and track the horizontal position of the user navigation device 102 as described with reference to block 408 of FIG. 4. The location calculation unit 106 can provide the new altitude and a current horizontal position of the user navigation device 102 to the routing unit 108. The flow continues at block 420.

At block 420, it is determined whether the routing directions to the destination should be updated. For example, the routing unit 108 can determine whether the routing directions to the destination 124 should be updated. The routing unit 108 can determine whether the current horizontal position and the new altitude of the user navigation device 102 are in accordance with the route determined at block 410 of FIG. 4. If it is determined that the routing directions to the destination should be updated, the flow continues at block 422. Otherwise, the flow continues at block 424.

At block 422, the routing directions to the destination are updated and are presented on the user navigation device. For example, the routing unit 108 can update the routing directions to the destination 124 based on the current horizontal position and the new altitude of the user navigation device 102. The routing unit 108 can recalculate the routing directions to the destination 124 as described with reference to block 410 of FIG. 4. The routing unit 108 can present the updated routing directions on the user navigation device 102. The flow continues at block 424.

At block 424, it is determined whether a map at the new altitude of the user navigation device is available. For example, the routing unit 108 determines whether a map of the indoor environment at the new altitude of the user navigation device 102 is available as described with reference to block 412 of FIG. 4. If it is determined that the map that corresponds to the new altitude of the user navigation device 102 is available, the flow continues at block 426. Otherwise, the flow ends.

At block 426, the new map that that corresponds to the new altitude of the user navigation device 102 is identified and is presented on the user navigation device. For example, the routing device 108 identifies and presents the new map on the user navigation device 102 as described with reference to block 414 of FIG. 4. From block 426, the flow ends.

It is noted that although FIG. 4 and FIG. 5 depict the flow 400 ending after the new map is presented on the user navigation device 102 (at block 426) or after it is determined that the pressure at the user navigation device was unchanged (at block 416), embodiments are not so limited. In some implementations, the pressure sensor 104 can continue to monitor the pressure at the user navigation device 102. On detecting a change in the pressure at the user navigation device 102, the location calculation unit 106 can determine a new altitude of the user navigation device 102 as described in FIGS. 4 and 5.

It is noted that although FIGS. 1-5 describe a distributed positioning system where access points in a building comprise pressure sensors and are capable of transmitting reference location and pressure information to the user navigation device 102, embodiments are not so limited. In some embodiments, a centralized positioning system may be implemented where the user navigation device 102 may communicate with a centralized location server to determine the location of the user navigation device 102 as will be described with reference to FIG. 6. This can enable the user navigation device 102 to determine its location when the access points are legacy WLAN access points and/or have limited capabilities (e.g., when the access points do not comprise pressure sensors)

Figure 6:
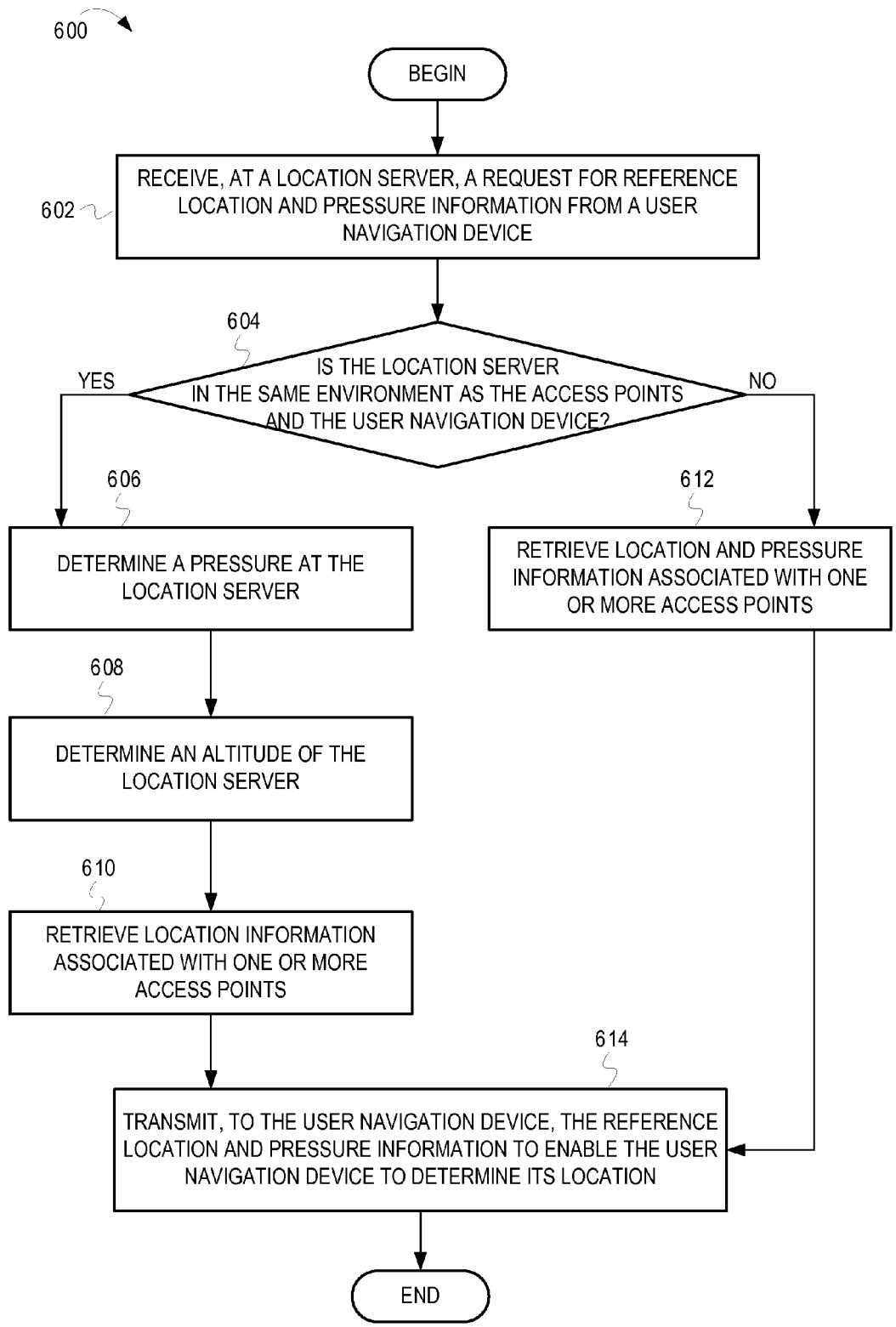
FIG. 6 is a flow diagram illustrating example operations of a centralized location server enabling a user navigation device to determine its location.

FIG. 6 is a flow diagram 600 illustrating example operations of a centralized location server enabling a user navigation device to determine its location. The flow 600 begins at block 602.

At block 602, a request for reference location and pressure information is received at a location server from a user navigation device. For example, the location server (not shown in FIG. 1) can receive the request from the user navigation device 102 of FIG. 1. The user navigation device 102 can establish a connection to the location server and can transmit the request for the reference location and pressure information to the location server. In one implementation, the user navigation device 102 may transmit the request for the reference location and pressure information to a location server if one or more access points do not comprise a pressure sensor. In another implementation, the user navigation device 102 may communicate with the location server for security purposes (e.g., as part of a communication protocol, to protect the location of the access points, etc.). The flow continues at block 604.

At block 604, it is determined whether the location server is in the same environment as the access points. For example, the location server may determine whether the location server is in the same building as the access points 116 and the user navigation device 102, in a controlled environment that mirrors the environment in which the access points are located, etc. The location server may check the status of a flag to determine whether the location server in the same environment as the access points. For example, flag=0 can indicate that the location server is the same environment as the access points. If it is determined that the location server in the same environment as the access points 116 and the user navigation device 102, the flow continues at block 606. Otherwise, the flow continues at block 612.

At block 612, location and pressure information associated with one or more access points is retrieved. The flow 600 moves from block 604 to block 612 on determining that the location server is not in the same environment as the access points and the user navigation device 102. In some implementations, the location server can provide a last known reference access point location and pressure information to the user navigation device. In another implementation, the location server can transmit a message to the access points requesting a current access point location and pressure information. In another implementation, the location server can communicate with another server collocated with the access points to determine the access point location and pressure information for each of the access points. It is noted that in some implementations, the access points may not comprise pressure sensors. In such a situation, the pressure at the access points may be pre-programmed (e.g., during an access point installation stage) at the access point and/or at the location server. In some implementations, access points that are equipped with pressure sensors can communicate the access point pressure information to the location server. The one or more access points may not directly transmit the access point location and pressure information to the user navigation device 102 if the access points are unable to communicate with the user navigation device (e.g., because of software or protocol limitations, security concerns, etc.). In some implementations, the location server may provide only one reference pressure value and the corresponding reference altitude to enable the user navigation device 102 to calculate its altitude. In another implementation, the location server can provide multiple reference pressure values and the corresponding altitude to the user navigation device 102. The user navigation device 102, in turn, can determine an altitude measurement corresponding to each combination of the reference pressure and reference altitude. The user navigation device 102 can calculate an average of the multiple altitude measurements to determine the altitude of the user navigation device 102. The flow continues at block 614.

At block 606, a pressure at the location server is determined. The flow 600 moves from block 604 to block 606 on determining that the location server is in the same environment as the access point 116. The location server being in the same environment as the access points can indicate that the pressure measured at the location server can be provided as a reference pressure instead of the pressure at the access point 116. A pressure sensor implemented on the location server can be enabled and the pressure sensor can determine the pressure at the location server as described with reference to block 202 of FIG. 2. The flow continues at block 608.

At block 608, an altitude of the location server is determined. In one implementation, the location server may determine a pre-programmed altitude of the location server. In another implementation, the location server can comprise a GPS receiver and can determine the altitude of the location server (as described with reference to FIG. 3) based on GPS signals received from GPS satellites. The altitude of the location server can be provided as a reference altitude that corresponds to the reference pressure determined at block 606. The location calculation unit 106 of the user navigation device 102 can determine the altitude of the user navigation device based, in part, on the reference pressure (determined at block 606) and the reference altitude (determined at block 608) as described with reference to FIGS. 4-5. The flow continues at block 610.

At block 610, location information associated with one or more access points is retrieved. For example, as described above with reference to block 612, the location server can retrieve the location information associated with one or more access points. The location information may comprise a horizontal position of the access points and an altitude of the access points. The flow continues at block 614.

At block 614, the reference location and pressure information are transmitted to the user navigation device. The flow 600 moves from block 610 to block 614 on determining the pressure and altitude of the location server and after the location information associated with one or more access points is retrieved. The flow 600 moves from block 612 to block 614 after the reference location and pressure information associated with one or more access points are retrieved. As described above, the user navigation device 102 can use the reference location and pressure information to calculate the horizontal position and the altitude of the user navigation device 102. From block 614, the flow ends.

It should be understood that the depicted diagrams (FIGS. 1-6) are examples meant to aid in understanding embodiments and should not be used to limit embodiments or limit scope of the claims. Embodiments may perform additional operations, fewer operations, operations in a different order, operations in parallel, and some operations differently. For example, although FIG. 6 describes the location server providing access point location and pressure information to the user navigation device, and the user navigation device 102 calculating its horizontal position and altitude, embodiments are not so limited. In some implementations, the user navigation device 102 can transmit radio-signal measurements and the pressure at the user navigation device to the location server. The location server can receive reference location and pressure information from the access points and can calculate the altitude and the horizontal position of the user navigation device 102. The location server can communicate the altitude and the horizontal position of the user navigation device 102 to the user navigation device.

It is noted that although FIG. 3 describes the access point 116 executing operations for calculating access point location information based on identifying a location measurement with the smallest measurement error, embodiments are not so limited. In other embodiments, the user navigation device 102 can execute operations described with reference to FIG. 3 to determine location of the user navigation device 102 ("user navigation device location information"). The user navigation device 102 can then provide the user navigation device location information to the access point 116. In one implementation, the user navigation device 102 can broadcast the user navigation device location information and corresponding pressure information to location-unaware access points through a viral broadcast scheme. In the viral broadcast scheme, the user navigation device 102 can broadcast the user navigation device location information and corresponding pressure information to any access point in the vicinity of the user navigation device 102 without associating with the access point. The access point that receives the user navigation device location information and corresponding pressure information via the viral broadcast scheme can use the information from the user navigation device 102 as an approximation of the access point location and pressure information. The access point 116 can rebroadcast the received location and pressure information to other wireless network devices (e.g., WLAN devices, other access points, a location server, etc.). In another implementation, the user navigation device 102 may only transmit the user navigation device location information and corresponding pressure information to the access point 116 with which the user navigation device 102 has associated. The access point 116 can use the user navigation device location information to determine whether calculated access point location information is correct/valid. The access point 116 can also use the user navigation device location information as the access point location information if the access point 116 does not have the ability to determine its location (e.g., if the access point 116 does not comprise a GPS receiver).

It is noted that resolution and accuracy of the pressure sensor can vary depending on internal temperature at the access point 116 (e.g., temperature of the access point chip). Therefore, in some implementations, the access point 116 can comprise a temperature compensator. The temperature compensator can determine the difference between the ambient temperature at the access point 116 and the internal temperature and compensate for the difference in temperature. The access point 116 can then provide the compensated ambient temperature as a reference temperature (represented by $T_r$ in Eq. 1) to the user navigation device 102. In other implementations, the user navigation device 102 can comprise the temperature compensator. The temperature compensator at the user navigation device 102 can receive the reference temperature from the access point 116. The temperature compensator can compare the reference temperature with the temperature at the user navigation device 102. If the reference temperature is different from the temperature at the user navigation device 102, the temperature compensator can compensate for the difference in temperature.

In some implementations, the pressure sensor 104 of the user navigation device 102 can identify whether the user navigation device 102 is in an indoor or an outdoor environment based on the pressure at the user navigation device 102. Once the user navigation device 102 leaves the indoor environment, the calibrated altitude of the user navigation device 102 may no longer be accurate. Therefore, knowledge of whether the user navigation device 102 is in the indoor environment or the outdoor environment may be exploited to turn on/off the GPS receiver (if any) of the user navigation device 102 to extend battery life or to turn off the pressure sensor 104. The pressure sensor can also enable detection of illegal entry to sealed doors, broken car windows, cargo container breach, property theft, intruder detection, etc. by detecting a sudden spike or dip in the pressure. If the pressure sensor comprises a Wi-Fi communication interface, the pressure sensor can trigger an alert via the Wi-Fi communication interface. A GPS receiver or other positioning system if collocated with the pressure sensor can provide location information with the alert.

Lastly, it is noted that although FIGS. 1-6 depict the user navigation device 102 calculating its altitude and horizontal position based on reference pressure and reference location information received from one or more access points, embodiments are not so limited. In some implementations, cellular networks can be used instead of (or in conjunction with) Wi-Fi access points to enable the user navigation device 102 to calculate its altitude and horizontal position. A pressure sensor at a cellular tower can determine pressure at the cellular tower. The cellular tower can communicate the determined pressure and corresponding altitude to the user navigation device 102. The user navigation device 102 can receive multiple sets of pressure and altitude information—each from a different cellular tower and can calculate the altitude of the user navigation device 102.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
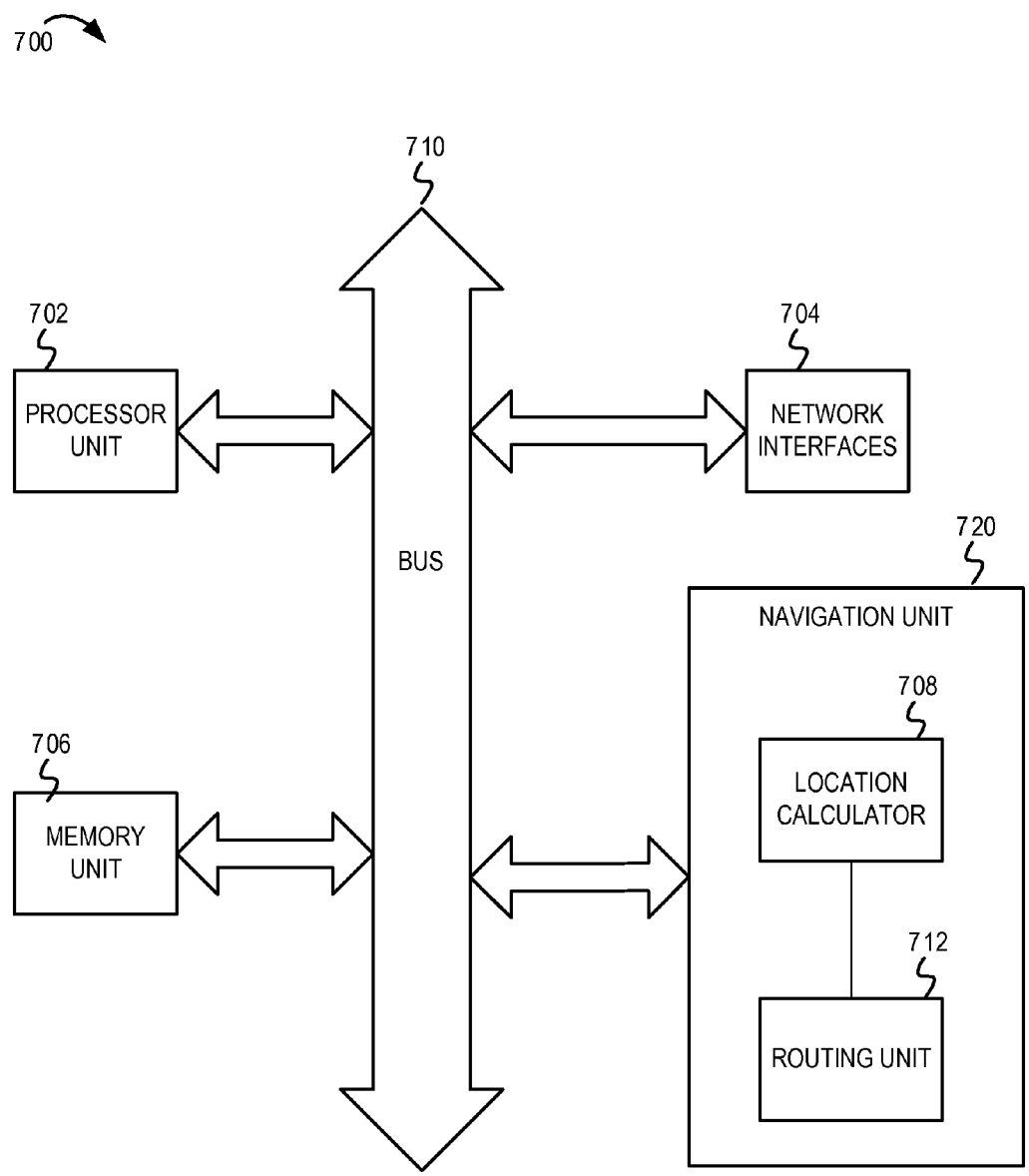
FIG. 7 is a block diagram of one embodiment of an electronic device including a mechanism for indoor positioning using pressure sensors and FIG. 8 is a block diagram of one embodiment of an access point including a mechanism for enabling indoor positioning of a navigation device.

FIG. 7 is a block diagram of one embodiment of an electronic device 700 including a mechanism for indoor positioning using pressure sensors. In some implementations, the electronic device 700 may be a dedicated user navigation device (e.g., a portable GPS system) configured to determine the location of the user navigation device and routing directions to a destination. In another implementation, the electronic device 700 may be an electronic device, such as a laptop, a netbook, a mobile phone, a personal digital assistant (PDA), or other portable electronic systems, which includes a navigation module or a navigation unit. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, Infini-Band®, NuBus, AHB, AXI, etc.), and network interfaces 704 that include at least one wireless network interface (e.g., a WLAN interface, a Bluetooth® interface, a WiMAX interface, a ZigBee® interface, a Wireless USB interface, etc.).

The electronic device 700 also includes a navigation unit 720 comprising a location calculation unit 708 coupled to a routing unit 712. In some implementations, the electronic device 700 can also comprise a pressure sensor (not shown) coupled to the location calculation unit 708. In another implementation, the location calculator 708 may interface with an external pressure sensor to determine the pressure at the electronic device 700. The location calculation unit 708 can implement functionality to determine an altitude and horizontal position of the electronic device 700 based on reference pressure and altitude information received from access points, and based on pressure measured at the electronic device 700, as described above with reference to FIGS. 1, 3-5. The routing unit 712 can implement functionality to determine routing directions to a destination, as described with reference to FIGS. 4-5. It is noted that, in some implementations, the location calculation unit 708 and/or the routing unit 712 can be implemented on a common chip or integrated circuit, on separate chips and then coupled together, etc.

Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 706 are coupled to the bus 710. Although illustrated as being coupled to the bus 710, the memory unit 706 may be coupled to the processor unit 702.

Figure 8:
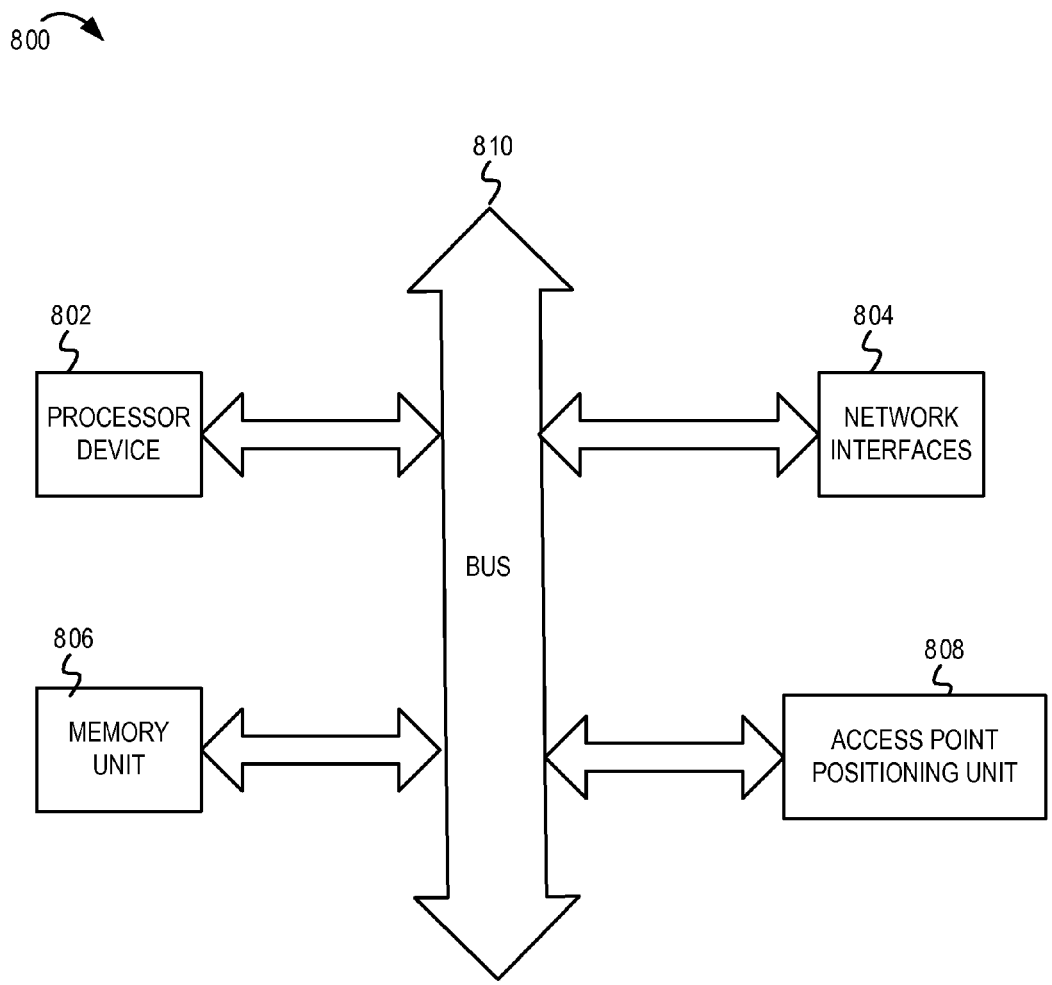

FIG. 8 is a block diagram of one embodiment of an access point 800 including a mechanism for enabling indoor positioning of a navigation device. In some implementations, the access point 800 may be a fixed access point. In another implementation, the access point 800 may be a mobile access point. Furthermore, in some implementations, the access point 800 may be a standalone access point, an access point implemented within another electronic device, etc. The access point 800 includes a processor unit 802 (possibly including multiple processors, multiple cores, multiple nodes, and/or implementing multi-threading, etc.). The access point 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The access point 800 also includes a bus 810 (e.g., PCI, ISA, PCI-Express, HyperTransport®, Infini-Band®, NuBus, AHB, AXI, etc.), and network interfaces 804 that include at least one wireless network interface (e.g., a WLAN interface, a Bluetooth® interface, a WiMAX interface, a ZigBee® interface, a Wireless USB interface, etc.).

The access point 800 also includes an access point positioning unit 808 coupled to the bus 810. In some implementations, the access point 800 can also comprise a pressure sensor (not shown) coupled to the access point positioning unit 808. In another implementation, the access point positioning unit 808 may interface with an external pressure sensor to determine the pressure at the access point 800. The access point positioning unit 808 implements functionality to determine access point location information associated with the access point 800, as described with reference to FIGS. 1-3. Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the memory unit 806, and the network interfaces 806 are coupled to the bus 810. Although illustrated as being coupled to the bus 810, the memory unit 806 may be coupled to the processor unit 802.

While the embodiments are described with reference to various implementations and exploitations, it will be understood that these embodiments are illustrative and that the scope of the inventive subject matter is not limited to them. In general, techniques for indoor positioning using pressure sensors as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for position estimation, the method comprising:
   receiving, by a location server, a request for reference information from a wireless network device located in an indoor environment, wherein the indoor environment also includes a first access point;
   determining, by the location server, whether the location server is located in a same indoor environment as the first access point and the wireless network device based, at least in part, on a value stored at the location server;
   in response to determining that the location server is located in the same indoor environment,
      determining, by the location server, a reference altitude and a reference pressure at the location server; and
      transmitting, by the location server, the reference altitude and the reference pressure to the wireless network device for the wireless network device to determine its altitude in the indoor environment in response to determining that the location server is not located in the same indoor environment,
   determining, by the location server, an altitude of the first access point and a pressure at the first access point; and
   transmitting, by the location server, the altitude of the first access point and the pressure at the first access point to the wireless network device for the wireless network device to determine its altitude in the indoor environment.

2. The method of claim 1, wherein the indoor environment includes a plurality of access points, further comprising:
   determining, by the location server, multiple pressure and altitude measurements from the plurality of access points; and
   transmitting, by the location server, the multiple pressure and altitude measurements to the wireless network device for the wireless network device to determine its altitude in the indoor environment based, at least in part, on the multiple pressure and altitude measurements.

3. The method of claim 1, further comprising:
   transmitting, by the location server, a message to the first access point requesting the first access point to provide the altitude of the first access point, the pressure at the first access point, and a horizontal position of the first access point.

4. The method of claim 1, further comprising:
   determining, by the location server, a reference horizontal position, wherein said determining the reference horizontal position includes one of:
      determining, by the location server, a horizontal position of the first access point; or
      determining, by the location server, a horizontal position of the location server.

5. The method of claim 4, further comprising:
   transmitting, by the location server, the reference horizontal position to the wireless network device for the wireless network device to determine its horizontal position in the indoor environment.

6. The method of claim 1, wherein the reference pressure at the location server is determined using a pressure sensor on the location server.

7. The method of claim 1, wherein the location server receives the request for reference information from the wireless network device when the first access point is not capable of determining a pressure at the first access point.

8. The method of claim 1, further comprising:
   receiving, by the location server, contextual information associated with the indoor environment from the wireless network device; and
   determining, by the location server, an altitude of the wireless network device based, at least in part, on the contextual information.

9. The method of claim 8, wherein the contextual information includes at least one member selected from the group consisting of a building level where the wireless network device is located, a name of a shop closest to the wireless network device, and an image of the shop closest to the wireless network device.

10. The method of claim 1, wherein a second wireless network device is located in the indoor environment, further comprising:
    determining the first access point located in the indoor environment is not capable of determining a pressure at the first access point and an altitude of the first access point; and
    adopting, by the first access point, an altitude associated with the second wireless network device as a reference altitude of the first access point, and a pressure associated with the second wireless network device as a reference pressure of the first access point.

11. The method of claim 10, further comprising:
    rebroadcasting, by the first access point, the altitude associated with the second wireless network device and the pressure associated with the second wireless network device to a second access point of the indoor environment.

12. The method of claim 1, wherein said determining the altitude of the first access point and the pressure at the first access point comprises:
    receiving, by the location server, a reference pressure and a reference altitude from the first access point that the first access point received from a second wireless network device located in the indoor environment.

13. The method of claim 1, further comprising:
determining, by the location server, a horizontal position of the first access point; and
transmitting, by the location server, the horizontal position of the first access point to the wireless network device for the wireless network device to determine its horizontal position in the indoor environment.

14. The method of claim 13, wherein said determining the altitude of the first access point, the pressure at the first access point, and the the horizontal position of the first access point comprises:
receiving, by the location server, a rebroadcast from the first access point of a reference pressure, a reference altitude, and a reference horizontal position received from a second wireless network device located in the indoor environment.

15. The method of claim 1, wherein said determining whether the location server is located in the same indoor environment comprises determining whether the location server is located in a same building as the first access point and the wireless network device.

16. A location server comprising:
a processor; and
a memory to store instructions, which when executed by the processor, cause the location server to:
receive a request for reference information from a wireless network device located in an indoor environment, wherein the indoor environment also includes a first access point;
determine whether the location server is located in a same indoor environment as the first access point and the wireless network device based, at least in part, on a value stored at the location server;
in response to determining that the location server is located in the same indoor environment,
determine a reference altitude and a reference pressure at the location server; and
transmit the reference altitude and the reference pressure to the wireless network device for the wireless network device to determine its altitude in the indoor environment in response to determining that the location server is not located in the same indoor environment,
determine an altitude of the first access point and a pressure at the first access point; and
transmit the altitude of the first access point and the pressure at the first access point to the wireless network device for the wireless network device to determine its altitude in the indoor environment.

17. The location server of claim 16, wherein the indoor environment includes a plurality of access points, wherein the instructions, which when executed by the processor, further cause the location server to:
determine multiple pressure and altitude measurements from the plurality of access points; and
transmit the multiple pressure and altitude measurements to the wireless network device for the wireless network device to determine its altitude in the indoor environment based, at least in part, on the multiple pressure and altitude measurements.

18. The location server of claim 16, wherein the instructions, which when executed by the processor, further cause the location server to:
determine a reference horizontal position based, at least in part, on one of a horizontal position of the first access point or a horizontal position of the location server.

19. The location server of claim 18, wherein the instructions, which when executed by the processor, further cause the location server to:
transmit the reference horizontal position to the wireless network device for the wireless network device to determine its horizontal position in the indoor environment.

20. The location server of claim 16, further comprising a pressure sensor configured to determine the reference pressure at the location server.

21. The location server of claim 16, wherein the instructions, which when executed by the processor, further cause the location server to:
determine a horizontal position of the first access point; and
transmit the horizontal position of the first access point to the wireless network device for the wireless network device to determine its horizontal position in the indoor environment.

22. A non-transitory machine-readable storage medium having instructions stored therein, which when executed by a processor causes the processor to perform operations that comprise:
receiving, by a location server, a request for reference information from a wireless network device located in an indoor environment, wherein the indoor environment also includes a first access point;
determining, by the location server, whether the location server is located in a same indoor environment as the first access point and the wireless network device based, at least in part, on a value stored at the location server;
in response to determining that the location server is located in the same indoor environment,
determining, by the location server, a reference altitude and a reference pressure at the location server; and
transmitting, by the location server, the reference altitude and the reference pressure to the wireless network device for the wireless network device to determine its altitude in the indoor environment in response to determining that the location server is not located in the same indoor environment,
determining, by the location server, an altitude of the first access point and a pressure at the first access point; and
transmitting, by the location server, the altitude of the first access point and the pressure at the first access point to the wireless network device for the wireless network device to determine its altitude in the indoor environment.

23. The non-transitory machine-readable storage medium of claim 22, wherein the indoor environment includes a plurality of access points, wherein the operations further comprise:
determining, by the location server, multiple pressure and altitude measurements from the plurality of access points; and
transmitting, by the location server, the multiple pressure and altitude measurements to the wireless network device for the wireless network device to determine its altitude in the indoor environment based, at least in part, on the multiple pressure and altitude measurements.

* * * * *